No. 656,644. Patented Aug. 28, 1900.
L. HOLLAND-LETZ.
ENDLESS FEED BELT AND APRON AND CARRYING SHAFT FOR SAME.
(Application filed Feb. 23, 1899.)
(No Model.)
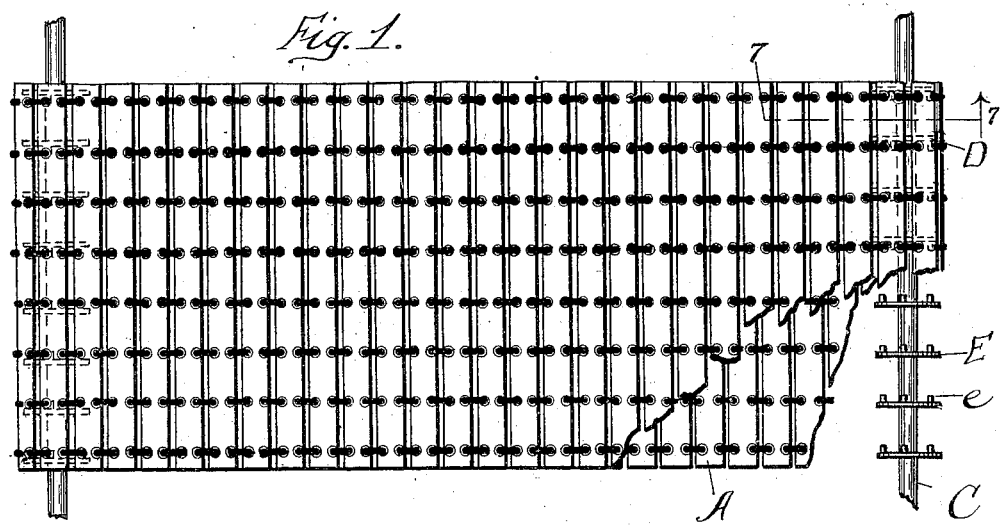
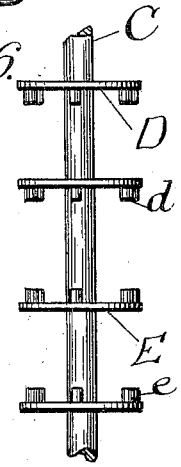
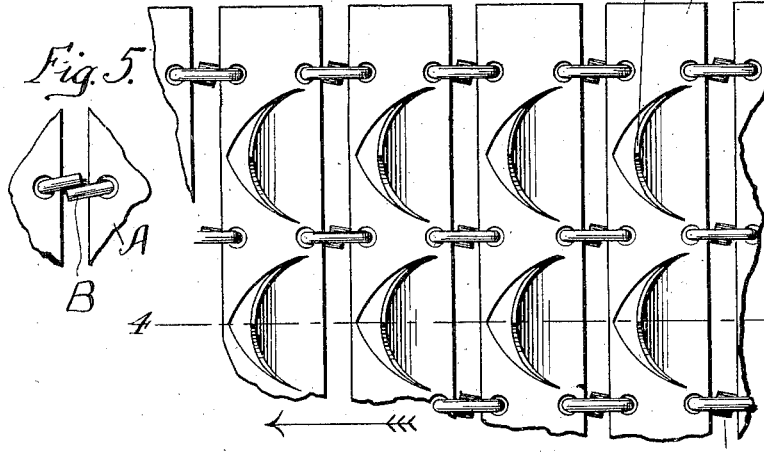
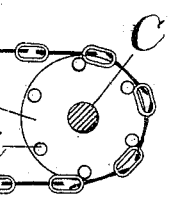
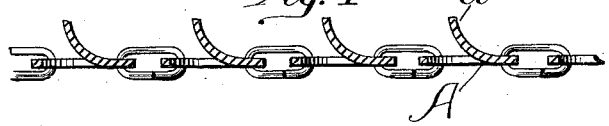
Witnesses:
Chas. B. Gillson.
Paul Carpenter
Inventor:
Louis Holland-Letz
By Louis K. Gillson,
Atty.
THE NORRIS PETERS CO., PHOTO-LITHO., WASHINGTON, D. C.

UNITED STATES PATENT OFFICE.

LOUIS HOLLAND-LETZ, OF CROWN POINT, INDIANA.

ENDLESS FEED BELT AND APRON AND CARRYING-SHAFT FOR SAME.

SPECIFICATION forming part of Letters Patent No. 656,644, dated August 28, 1900.

Application filed February 23, 1899. Serial No. 706,495. (No model.)

*To all whom it may concern:*

Be it known that I, LOUIS HOLLAND-LETZ, a citizen of the United States, and a resident of Crown Point, in the county of Lake and State of Indiana, have invented certain new and useful Improvements in Endless Feed Belts and Aprons and Carrying-Shafts for the Same, of which the following is a specification and which are fully illustrated in the accompanying drawings, forming a part thereof.

This invention relates to feed-aprons used in connection with agricultural machinery—such as corn-huskers, harvesters, and the like—the apron being adapted to receive and convey the material being operated upon by the machine.

The object of the invention is to provide an improved form of apron of this class which will be far more efficient and durable than the canvas aprons commonly employed; and the invention consists in the various parts and arrangement of parts, as fully hereinafter described and as illustrated in the accompanying drawings, in which—

Figure 1 is a plan view of the apron mounted upon a pair of shafts, the parts being partly broken away. Fig. 2 is a detail longitudinal section of the apron. Fig. 3 is a detail plan of the same upon an enlarged scale and showing a modified form of construction. Fig. 4 is a sectional view on the line 4 4 of Fig. 3. Fig. 5 is a detail of the apron. Fig. 6 is a detail plan of the shaft adapted to carry the aprons, and Fig. 7 is a detail section on the line 7 7 of Fig. 1.

The conveyer or apron A is composed of a plurality of sheet-metal strips extending crosswise of the apron and being united by the links B, which pass through suitable apertures punched in the strips. These links are of wire and are preferably simple loops, having their ends overlapped, as plainly shown in Figs. 3 and 5. The links are as numerous as may be deemed advisable and are preferably set in rows longitudinal as to the apron. The shafts C, carrying the apron, are provided with a plurality of disks D E, upon the peripheries of which the inner face of the apron bears. These disks are provided with laterally-projecting lugs or spurs $d$ $e$, set slightly in from their peripheries and adapted to engage the links B. The shafts may be provided with as many of these disks as may be necessary and are so spaced apart that the belt may be so mounted upon the shafts that the several lines of links will engage their spurs. Preferably some of the disks have their spurs facing in one direction and some in the opposite direction. As shown, the spurs are all directed toward the middle of the apron. By this arrangment the conjoint action of the shafts and the apron is analogous to the action of a sprocket-wheel and its chain.

The strips of which the apron A is composed may be provided with a plurality of upstanding tongues $a$, formed by means of a punch, which sufficiently cuts the metal and strikes up a point, as plainly shown in Figs. 3 and 4. This feature is not essential to the operation of the apron in some situations, but will be found quite desirable in some classes of machines.

An apron constructed as described is very durable and is not open to the objection that it will stretch—a serious fault with aprons composed of fabric, which not only stretch, so as to become loose, but are apt to stretch unevenly—that is to say, more at one side than at the other. The construction of the shaft described not only provides for a secure driving-grip upon the apron, but prevents the accumulation of dirt upon the face of the shaft. Most of the material used upon machines employing aprons of this kind sets free considerable dirt, which is often moist, and the apron soon becomes very foul. The apron of this application will permit such matter to fall through the spaces between its slats, and the shaft being formed as described it will not accumulate thereon, but will fall between the disks and will be rattled out through between the slats of the lower or return portion of the apron. When a shaft or roller is used which is a simple cylinder, it is not only without adequate friction to drive the apron, but the dirt accumulates upon its face and by the pressure of the apron is impacted there, so that the shaft gradually is built up and increased in diameter, often rendering the machine inoperative until its surface is cleaned off.

I claim as my invention—

1. In combination, a conveying belt or apron formed of a plurality of transversely-arranged sheet-metal strips and links for uniting adjacent strips, a roller for carrying such belt or apron and comprising a shaft and a plurality of disks mounted thereupon, the belt or apron bearing upon the peripheries of such disks, the disks being provided with axially-arranged studs adjacent to their peripheries for engaging the links of the belt or apron.

2. In a roller, the combination with a shaft, of a plurality of disks mounted upon the shaft and adapted to bear upon their peripheries a belt or apron, such disks having axially-arranged studs located adjacent to their peripheries.

LOUIS HOLLAND-LETZ.

Witnesses:
LOUIS K. GILLSON,
HESTER B. BAIRD.